Sept. 3, 1940.  V. H. CONLEY  2,213,485
LIQUID LEVEL INDICATOR
Filed June 9, 1938  2 Sheets-Sheet 1
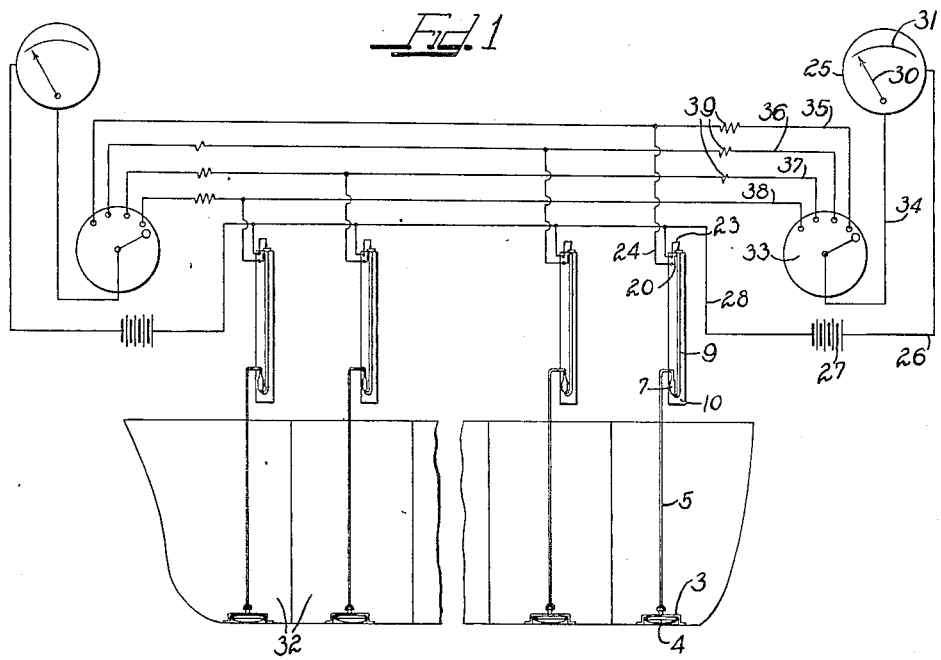
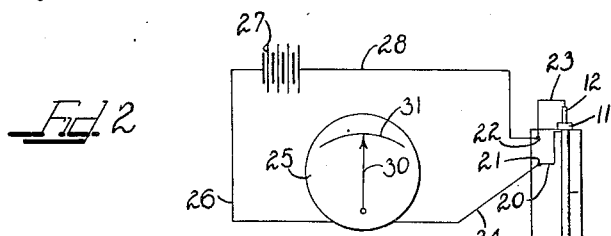
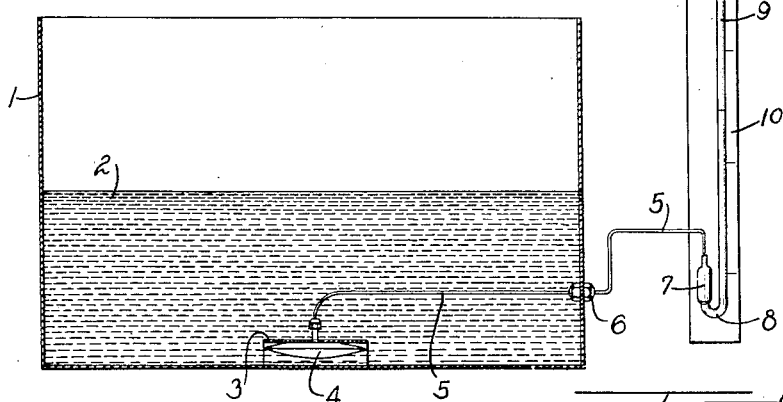
Inventor
VICTOR H. CONLEY
by
Attys.

Sept. 3, 1940.　　　V. H. CONLEY　　　2,213,485
LIQUID LEVEL INDICATOR
Filed June 9, 1938　　　2 Sheets-Sheet 2
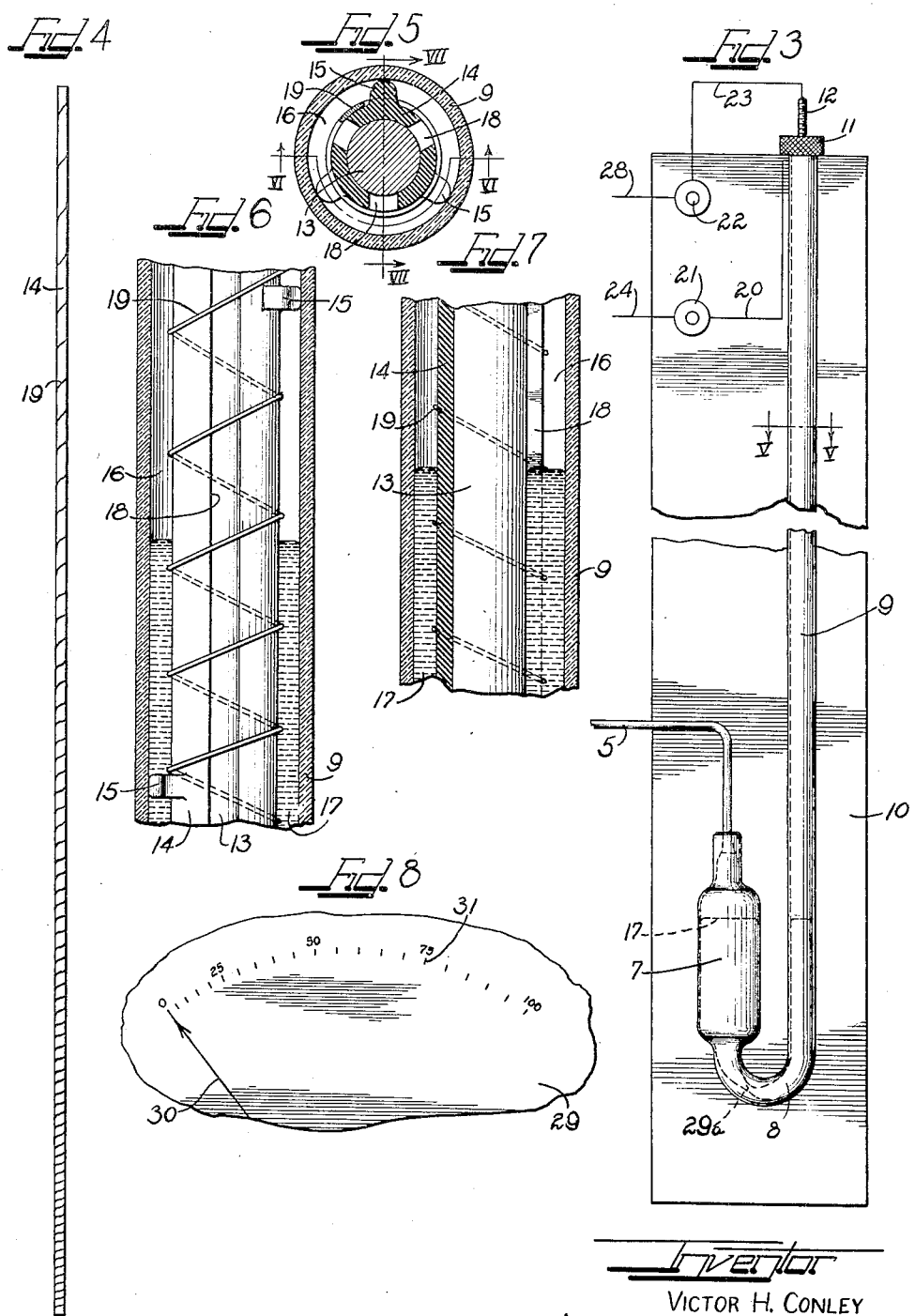
Inventor
VICTOR H. CONLEY
by　Charles Hell　Attys.

Patented Sept. 3, 1940

2,213,485

UNITED STATES PATENT OFFICE 2,213,485

LIQUID LEVEL INDICATOR

Victor H. Conley, Chicago, Ill.

Application June 9, 1938, Serial No. 212,654

2 Claims. (Cl. 201—48)

The present invention relates to liquid level indicators providing means for directly indicating, either at the liquid container or at remote stations, the level of the liquid in a container, such as an automobile gasoline tank, or for indicating the varying levels in the water ballast tanks, or in the bilge of steamships, or the like.

It is an object of this invention to provide a combination electrical and mechanical liquid level indicating system wherein the air controlling the operation of a mercury column is closed off and out of direct communication with the liquid which is being measured.

It is also an object of this invention to provide a liquid level indicating system including a mercury control unit wherein the resistance of any portion of the mercury column is eliminated by a construction using only a surface connection of the mercury column for establishing a connection between the conductors leading to an indicating meter.

It is a further object of this invention to provide a liquid level indicating system including a closed bellows type control positioned in a tank or container, the liquid contents of which is to be measured, said closed bellows type control being connected with a mercury control unit which includes a mercury column providing a surface connection between a conducting core located within an insulation sleeve around which a resistance conductor is engaged in the form of a helix, with the coils of the helix varying in pitch from one end of the conductor to the other permitting the indicating dial of a meter to have the graduated divisions forming substantially the upper half of the scale of substantially the same size to facilitate more accurate reading of the meter for the higher levels of the liquid in the container.

Still another object of the invention is the provision of a liquid level indicating system wherein a liquid tank has connected therewith a closed circuit mercury control unit including a compressible bellows unit, the contents of which is completely shut off from contact with the liquid in a tank to be measured, to afford an arrangement whereby the volume of air or gas used for actuating a mercury control column is not in danger of being varied due to absorption of the air or gas by the liquid in the tank so that a system is provided whereby more positive and accurate readings of the contents of a tank are made possible.

It is furthermore an object of this invention to provide a liquid level indicating system wherein a completely closed control unit is connected between the contents of a tank to be measured and an electrically controlled indicating meter, the readings on which are made more dependable due to the provision of a resistance coil, of graduated pitch from end to end, surrounding and insulated from a conducting core, contact with which is established by means of a top surface connection only of a mercury control column, the resistance of any length of which is entirely eliminated from affecting the electric control circuit governing the operation of the readings on a control meter forming a part thereof.

It is furthermore an object of this invention to provide a liquid level indicating system, of a multiple type, readily adaptable for use in connection with water ballast tanks or the bilge of steamships, whereby substantially accurate readings may be read at remote stations or at a central station by connecting the indicating meters with the various tanks by means of closed circuit mercury control units, each of which embodies a closed compressible diaphragm, the contents of which is free from contact with the liquid being measured, and which accurately actuates a mercury control column, the top surface of which only is used for establishing a connection between the conductors leading to an indicating meter thereby producing a control unit wherein the air or gas in the compressible diaphragm is not absorbed or otherwise affected by the liquid in the tank being measured, nor are the readings on the control meter affected by the resistance of the mercury column or any part of said column other than merely a surface connection of the mercury between the conductors leading to the meter.

It is an important object of this invention to provide an improved type of liquid level indicating system wherein a closed circuit control is disposed between the contents of a container to be measured and an electrically controlled indicating meter, the readings of which are made more accurate and more easily read by the provision of equal divisions in the upper brackets of the meter scale by the use of a resistance control coil, the loops of which vary in pitch from one end of the coil to the other and are positioned in the field of operation of a mercury column, the top surface of which only is used for establishing a connection between a selected loop of the coil and a core or electrode enclosed within a grooved insulator separating the core from the resistance coil to provide an arrangement whereby no sectional lengths of the mercury column are included in the indicating circuit to affect the same, as is the case in earlier patented liquid level indicators using open-circuit types of control in which the air or gas governing the operation of a mercury column is in communication with the liquid of a tank being measured, and in which the mercury column or portions of the column are included in the meter control circuit producing a variable resistance, depending upon the length of the mercury column included, thereby producing inaccurate readings on the indicating meter.

Other and further important objects of this invention will be apparent from the disclosures in the specification and the accompanying drawings.

The invention, in preferred form, is illustrated in the drawings and hereinafter more fully described.

On the drawings:

Figure 1 illustrates a diagram covering a liquid level system of a multiple type applied to a plurality of liquid containing compartments such as the water ballast tanks of steamships, for readily ascertaining the level of the contents of the various compartments by means of one or more indicators at remote stations.

Figure 2 indicates a diagram of a single liquid level indicating system, embodying the principles of this invention, and associated with a container or tank, the liquid contents of which is to be measured.

Figure 3 is an enlarged fragmentary elevational view of the mercury control unit forming part of the system.

Figure 4 is a detailed elevational view of the resistance coil unit in the form of a helix and forming part of the mercury control unit and illustrating the variations in pitch in the windings of the coil from one end of the unit to the other.

Figure 5 is an enlarged transverse detail section taken on line V—V of Figure 3.

Figure 6 is an enlarged vertical detail section taken on line VI—VI of Figure 5.

Figure 7 is an enlarged vertical detail section taken on line VII—VII of Figure 5.

Figure 8 is a fragmentary plan view of the dial of an indicating meter having a scale wherein the upper divisions are substantially the same size made possible by the use of the spiral resistance coil of variable pitch.

As shown on the drawings:

Referring to Figures 2 to 8 inclusive, which illustrate a single type of liquid level indicating mechanism, the reference numeral 1 indicates a container or tank containing a liquid 2, the level of which is to be measured and registered on an indicating mechanism. Mounted on the bottom of the tank 1 is a supporting framework 3 suitably opened at opposite sides to permit the liquid to fill the same. Disposed within the tank 1 and within the supporting framework 3 is a watertight collapsible bellows or diaphragm 4, the interior of which is filled with air or any suitable gas. Connected to an outlet in the top of the diaphragm 4 is one end of a pipe or tube 5 which projects out of the tank 1 through a suitable packing unit 6. The tube 5 has the outer end thereof extended to connect up with the neck of a mercury bulb or casing 7 forming part of a mercury control unit. The mercury bulb 7 is formed on one end of a U-shaped elbow or bight portion 8, one end of which integrally connects up with the lower end of an upright tube or sleeve 9 constructed of glass or other suitable material. The tube 9, together with the bulb 7, is mounted on a supporting board or panel 10. The upper end of the tube 9 is closed by means of a closure cap 11, through which a terminal pin or contact stud 12 projects. The terminal pin 12 forms an extension of a metal conducting core or post 13, which, as illustrated in Figures 5 and 7, is mounted within an insulation sleeve 14, the exterior of which is provided with projecting fingers or spacers 15 at spaced intervals for the purpose of contacting the inner face of the tube 9 to hold the insulation sleeve properly spaced therefrom, leaving a mercury chamber 16 in which a body of mercury 17 is permitted to rise and fall subject to the air pressure created in the diaphragm 4 by the pressure of the liquid 2 in the tank 1. The body of mercury 17 is contained in the bulb 7 and passes downwardly through the U-shaped connection 8 and then passes upwardly in the lower portion of the tube 9 around the insulation sleeve 14, as illustrated in Figure 6.

The insulation sleeve 14 is provided with a plurality of spaced longitudinally positioned slots 18, three of which are used as illustrated in Figure 5, permitting the mercury as it rises to enter the grooves 18, as shown in Figure 7, so that a surface connection or contact is made between the conductor core 13 through the top layer or surface of the mercury with one of the convolutions or coils forming a part of an improved type of resistance conductor 19 which is wound in the form of a helix around the insulation sleeve 14, as clearly illustrated in Figures 4, 6 and 7. As shown in Figure 4, the helix 19 is wound in position so that the coils thereof vary in pitch from one end of the helix to the other, with the pitch gradually increasing toward the lower end. The pitch of the various coils of the helix 19 is varied throughout the length of the resistance to provide an arrangement whereby more convenient readings, as well as more accurate readings, may be made on a meter scale. The upper end of the helix 19 extends out of the upper end of the tube 9 in the form of an extension wire or connection 20, the end of which is connected to a terminal or connector 21 on the mounting board or panel 10. A second terminal post or connector 22 is mounted on the board 10 and has connected therewith one end of a connecting wire or conductor 23, the other end of which is connected to the terminal post 12, as clearly illustrated in Figure 3. Connected to the terminal post 21 is one end of a conductor 24, the other end of which is connected to one terminal of an indicating instrument or meter 25 which may be mounted at any convenient place or station, either near the tank 1 or at a remote distance therefrom. Connected to the other terminal of the indicating meter 25 is one end of a conductor 26, the other end of which is connected up to a source of electrical energy such as a battery 27. Connected to the second terminal of the battery 27 is one end of a conductor 28, the other end of which is connected to the terminal post 22.

As illustrated in Figure 8, the indicating meter 25 is provided with an indicating dial 29 over which an indicator hand or pointer 30 is adapted to move to point out readings on an indicating scale 31.

The ordinary types of indicating meters used in connection with water level indicating systems have the divisions of the indicating scale 31 arranged with the divisions smallest near the zero point and gradually increasing in size up to the highest reading on the dial. This provides an arrangement wherein the divisions in the upper half of the scale are so large that it is very difficult to obtain accurate readings of the exact depth of liquid in the tanks. To overcome this defect and to provide a scale wherein the upper readings may be much more accurate, the coils of the helix 19 have been arranged so that the pitch varies from one end to the other, thereby affording an arrangement wherein the divisions in the upper brackets of the scale 31 are all substantially equal so that more convenient and more accurate readings may be obtained for the greater depths of the liquid in the tanks or containers which are being measured.

The operation of the device is very simple, and as illustrated in Figure 2, the liquid 2 in the tank 1 exerts a pressure on the closed air or gas bellows or diaphragm 4 depending upon the level or the depth of the liquid in the container or tank. The pressure exerted by the liquid on the diaphragm causes the diaphragm to be compressed thereby causing compression of the air or gas in the diaphragm so that a pressure is exerted in the connecting tube or pipe 5 allowing a corresponding pressure to be exerted on the body of mercury in the bulb 7. To minimize the accidental fluctuations in the level of the mercury which may be caused by the rolling or pitching of a vessel, if the level of the water in a ballast tank is being measured, or in cases where agitation of a liquid in a tank may occur, the mercury passage leading from the bulb 7 into the lower portion of the tube 9 is provided with a restriction at 29a (Figure 3). The pressure exerted on the mercury in the bulb 7 causes the mercury to rise in the chamber 16 of the tube 9 with portions of the mercury flowing into the grooves 18 into contact with the metal conducting core or post 13. The level of the mercury in the tube 9 depends upon the pressure exerted by the compressed air or gas in the diaphragm 4 so that the top surface of the mercury in the tube 9 rises to a predetermined level and causes a surface contact or connection to be made by the top layer of the mercury between the conductor core 13 and a portion of one of the coils of the helix 19. An electric circuit is thus established through the conductors 20 and 23, through the meter 25 and the battery 27 and the conductors connected therewith. The indicating hand 30 is thus moved across the graduated scale 31 to indicate in inches the depth of liquid 2 in the tank 1.

By using only a surface contact of the mercury in the tube 9 to establish a connection between the conductor core 13 and the helix 19, the resistance offered by the mercury column or any portion thereof is entirely eliminated from the circuit so that more accurate and more positive readings may be obtained on the meter. This feature, together with the provision of a helix wherein the pitch of the convolutions of the coil varies from one end of the coil to the other so that the divisions of the upper brackets of the scale 31 may be substantially of the same size, affords an added feature permitting more accurate readings of the levels or depths of liquid in tanks in cases where the tanks are more than half full.

Figure 1 illustrates a multiple use of the liquid level indicating units, wherein one of the units, such as illustrated in the setup shown in Figure 2, is associated with one of a plurality of water ballast tanks or compartments 32 of a steamship or liquid tanks used for any other purpose. In Figure 1 the parts which correspond to the parts hereinbefore described are designated by corresponding reference numerals.

In order to be able to connect up the various liquid level indicators associated with the various compartments or tanks 32, a control switch 33 is connected by means of a conductor 34 to the meter 25. Connected to the switch 33 are a plurality of conductors 35, 36, 37 and 38, which respectively are connected up to the conductors 24 of the respective water level indicator units associated with the various compartments or tanks 32. With this setup the switch 33 may be set to connect up any one of the plurality of water level indicating units so that a reading of the level or depth of the liquid in the selected compartment may be readily read on the meter 25. The meter 25 may of course be located at any selected station, either close to the tanks or at a remote distance therefrom.

As clearly illustrated in Figure 1, resistances 39 of different sizes may be located in the various conductors 35, 36, 37 and 38, to compensate for the difference in the lengths of said conductors so that the readings on the meter 25 will not be affected.

In case it is desired to provide indicating meters at a plurality of different locations, an additional system of instruments such as the meter 25, the switch 33 and a battery 27 may be connected up with the respective liquid level indicating units similar to the arrangement illustrated at the left of Figure 1.

It will of course be understood that various details of construction may be varied through a wide range without departing from the principles of this invention, and it is therefore not the purpose to limit the patent granted hereon otherwise than necessitated by the scope of the appended claims.

I claim as my invention:

1. In a liquid level indicator for indicating the level of liquid in a tank, and with the indicator including a closed gas-filled bellows to be placed on the bottom of the tank, a tube of insulating material shaped to define a vertical column connected at its lower end through a restricted neck to an upwardly directed bulbous extension defining a reservoir, said tube being disposed exteriorly of the liquid in the tank, a centrally disposed conducting core in said vertical column, a slotted insulating cover on said core, a resistance wire disposed in the form of a helix extending along and supported by said cover, mercury in said tube, a pipe connecting said gas-filled bellows and said reservoir to communicate gas pressure to said mercury, and a cap on the upper end of said vertical column.

2. A liquid level indicator for indicating the level of liquid in a tank, said indicator comprising a closed gas-filled bellows to be placed on the bottom of the tank, a tube of insulating material shaped to define a vertical column connected at its lower end through a restricted neck to an upwardly directed bulbous extension defining a reservoir, mercury in said tube, a pipe connecting said bellows and said tube to communicate gas pressure to said mercury, a centrally disposed conducting core in said tube, a slotted insulating sleeve on said core, a resistance wire disposed along said sleeve, and fingers on said sleeve engaging the inner face of the vertical column of said tube to maintain said sleeve in spaced assembled relation to said tube.

VICTOR H. CONLEY.